United States Patent [19]

Hundley, III

[11] Patent Number: 4,621,996
[45] Date of Patent: Nov. 11, 1986

[54] REMOVABLE DIE CENTER FOR EXTRUSION DIES

[75] Inventor: Raymond E. Hundley, III, Eagle Rock, Va.

[73] Assignee: Gala Industries, Inc., Winfield, W. Va.

[21] Appl. No.: 727,242

[22] Filed: Apr. 24, 1985

[51] Int. Cl.$^4$ ............... B29C 47/30; B29C 47/86
[52] U.S. Cl. ............................ 425/190; 425/67; 425/308; 425/310; 425/378 S; 425/464; 425/DIG. 13
[58] Field of Search ............... 425/461–463, 425/190, 308, 310, 378 R, 378 S, 464, 67, 379 R, 379 S, 466, DIG. 13

[56] References Cited

U.S. PATENT DOCUMENTS

| | | | |
|---|---|---|---|
| 1,160,299 | 11/1915 | McFerren | 425/461 |
| 3,308,507 | 3/1967 | Black | 425/67 |
| 3,957,565 | 5/1976 | Livingstone et al. | 425/464 |
| 4,123,207 | 10/1978 | Dudley | 425/379 R |
| 4,167,386 | 9/1979 | Mallay | 425/463 |
| 4,248,577 | 2/1981 | Bory et al. | 425/463 |
| 4,300,877 | 11/1981 | Anderson | 425/67 |
| 4,327,050 | 4/1982 | Salmon | 425/67 |
| 4,378,964 | 4/1983 | Wolfe | 425/463 |
| 4,465,449 | 8/1984 | Hornbeck | 425/462 |
| 4,529,370 | 7/1985 | Holmes et al. | 425/463 |

Primary Examiner—Willard E. Hoag
Attorney, Agent, or Firm—Harvey B. Jacobson

[57] ABSTRACT

An extrusion die plate for a plastic pelletizing machine having a removable central insert having the plurality of extrusion orifices incorporated therein with the main body of the die plate including an opening receiving the insert with the insert being capable of quick and easy removable for cleaning of plastic material and for replacement of the insert with other inserts having a different number of extrusion orifices or a different size of extrusion orifices. The insert is screw threadedly connected or otherwise quickly detachably connected in an opening in the main body of the die plate to reduce the down time for maintenance and for product changes.

3 Claims, 2 Drawing Figures

REMOVABLE DIE CENTER FOR EXTRUSION DIES

BACKGROUND OF THE INVENTION

1. Field of the Invention

The present invention generally relates to improvements in an extrusion die used when pelletizing plastics and more specifically relates to a removable center or die plate insert for an extrusion die enabling the portion of the extrusion die having the orifices therein to be easily removed for cleaning or removed for replacement with a die plate insert having a different number of orifices or different size of orifices thereby substantially reducing the down time of an underwater plastic pelletizing machine especially in installations where product changes are frequent.

2. Information Disclosure Statement

Plastics are frequently pelletized by extruding plastic through extrusion dies having a plurality of orifices therein with the downstream end of the orifices having a wear surface engaged by a rotating blade assembly which cuts the extruded plastic into pellets. In certain production techniques such as in relatively small compounding operations, product changes are rather frequent. In making product changes, it frequently is necessary to replace the extrusion die with a die having a different size or number of extrusion orifices. Also, it is necessary to remove the extrusion die plate for cleaning purposes from time to time.

The general structure of an underwater pelletizer of the above described type is disclosed in U.S. Pat. No. 4,123,207, issued Oct. 31, 1978, for UNDERWATER PELLETIZER AND HEAT EXCHANGER DIE PLATE. Additionally, the following U.S. patents relate to extrusion die structures:

U.S. Pat. No. 3,905,743 Sept. 10, 1975
U.S. Pat. No. 3,947,214 Mar. 30, 1976
U.S. Pat. No. 4,182,603 Jan. 8, 1980
U.S. Pat. No. 4,290,989 Sept. 22, 1981
U.S. Pat. No. 4,343,609 Aug. 10, 1982

When removing electrically heated extrusions dies, the cartridge heaters used to heat the die plate must be extracted or removed thus resulting in maintenance problems since the heating cartridges frequently become stuck in the cartridge cavity in the die plate and their lead wires sometimes become frayed. In addition, the loss of time required to remove the cartridges, the die plate, install another die plate and reassemble the heating cartridges is substantial and the cost of clean-up and maintenance has become a major factor in the economics of pelletizing plastics. None of the prior art plastic pelletizers provide an effective solution to this ongoing problem and cost.

SUMMARY OF THE INVENTION

An object of the above invention is to provide an extrusion die for pelletizing plastics in which the central portion of the die which contains the extrusion orifices is formed as a separate component from the body of the die plate and is removably mounted in the die plate so that it can be quickly and easily removed for cleaning or removed for replacement with a die plate insert having different size or number of orifices thereby substantially reducing the time required to clean-up and maintain the extrusion die and to change the extrusion characteristics of the extrusion die and substantially reduce the down time of a pelletizer.

In the embodiment of the invention disclosed, the removable central portion or die plate insert is screw threadedly attached to the main body of the die plate with the screw threaded connection being peripherally outwardly of the extrusion orifices so that when it is desired to remove the die plate insert for cleaning or replacement, this procedure can be quickly and economically accomplished. While a screw threaded connection between the die plate insert and the die plate has been disclosed, it is also within the purview of the present invention to provide other types of quick change structure such as a sliding engagement between the die plate insert and the main body of the die plate.

Another object of the invention is to provide a removable center die plate insert for an extrusion die in an underwater plastic pelletizing machine or the like which enables quick and easy removal and replacement of the die plate insert to facilitate cleaning or change in the characteristics of the extrusion orifices and which is of rugged construction to withstand the wear and forces encountered in an extrusion die with the structure enabling accurate reassembly of the die plate insert so that the downstream end of the die plate insert and the wear plate or surface thereon will be accurately related to the blade assembly.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
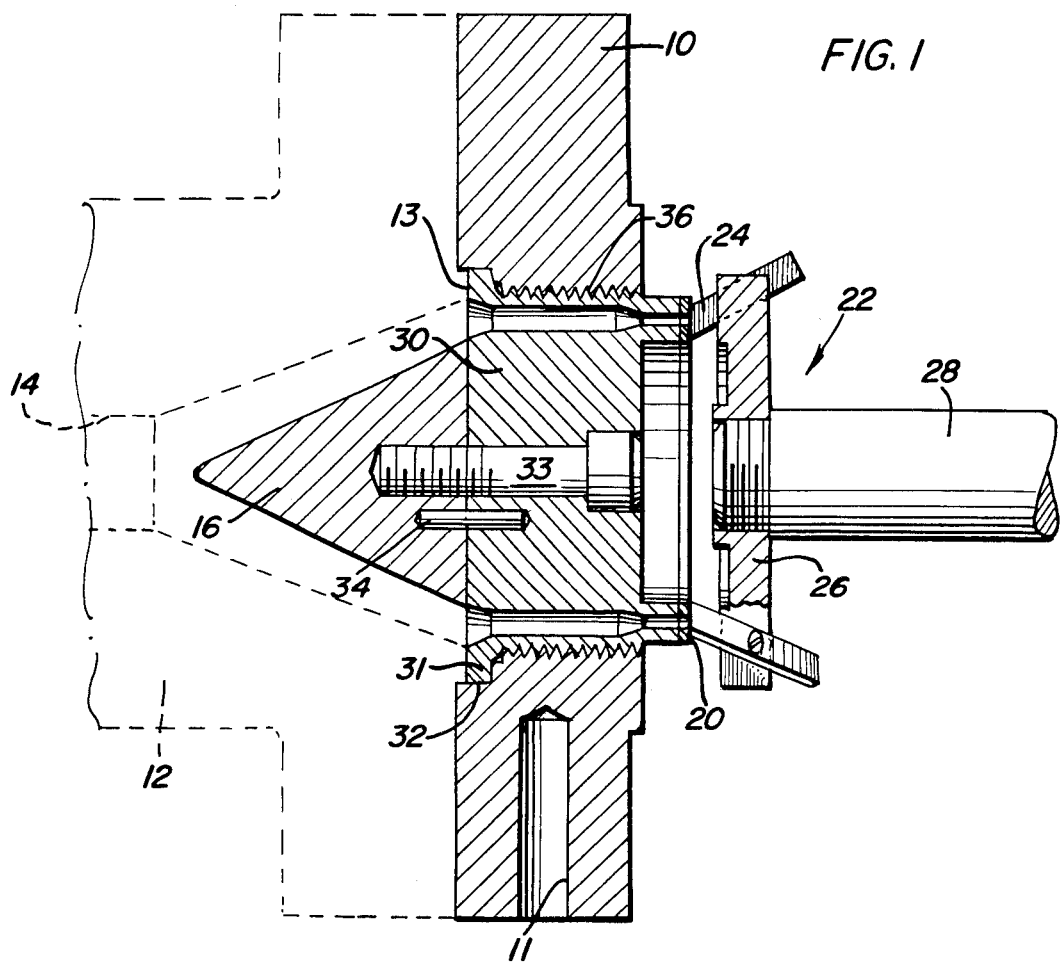
FIG. 1 is a vertical sectional view, with portions in elevation, illustrating the removable center die plate insert associated with the main body of a die plate and an underwater pelletizing machine.
Figure 2:
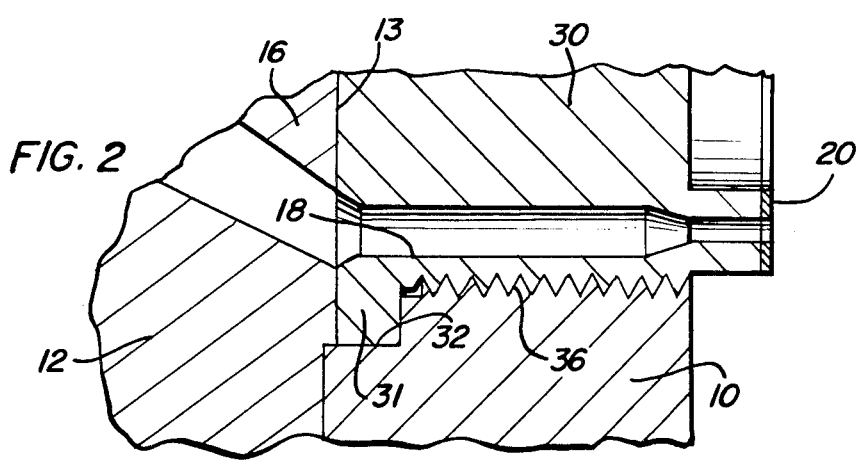
FIG. 2 is a fragmental sectional view, on an enlarged scale, illustrating specific structural details of the threaded connection between the die plate insert and the die plate.

Referring now specifically to the drawings, an extrusion die assembly is illustrated in FIG. 1 such as that utilized in an underwater plastic pelletizer with the present invention incorporated therein. The pelletizing machine includes a die plate 10 having a plurality of circumferentially spaced and radially disposed bores or recesses 12 which receive electrically operated heating cartridges for heating the die plate in a well known manner. The die plate 10 includes an inlet housing 12 connected with its upstream side with the inlet housing 12 including an inlet passageway 14 for molten polymer which is diverted by a nose cone 16 through a plurality of extrusion orifices 18 so that the plastic is extruded in a continuous ribbon from the downstream side of the die plate 10 which is provided with a wear surface 20. Associated with the wear surface 20, formed by a wear ring or the like, is a knife assembly 22 including a plurality of blades 24 supported by a holder 26 on a driven shaft 28 so that the extruded ribbon of plastic will be cut into a plurality of pellets. The aforedescribed structure is conventional in and of itself.

The present invention is a die plate insert 30 of generally the same thickness as the die plate 10 and the extrusion orifices 18 are formed in the insert 30. The die plate insert 30 forms the center of the die plate and is removably connected to the main body of the die plate in order to form a complete extrusion die plate. The die plate insert 30 also includes the wear face 20 at the downstream end of the orifices 18 and has the nose cone 16 detachably secured thereto by a cap bolt or screw 33 with a dowel pin 34 or the like precluding rotational movement of the nose cone in relation to the die plate insert 30 so that the nose cone 16 may be disconnected or separated from the die plate insert 30 when desired for cleaning or replacement with a different size or type of nose cone. As illustrated, the periphery of the nose cone generally coincides with the flared inlet end of the extrusion die orifices 18.

The die plate insert 30 is detachably connected to the main body of die plate 10 by the use of a screw threaded connection 36 in which the exterior of the die plate insert 30 is provided with external threads and the interior of the opening extending through the main body of the die plate 10 is provided with internal threads so that by using a conventional spanner wrench engaging appropriate sockets in the die plate insert 30, the die plate insert 30 may be easily removed from the center of the main body of the die plate 10 for the purpose of cleaning or for the purpose of replacing the die plate insert 30 with a different insert having a different number of orifices or orifices of a different size thereby enabling product changes to be quickly and easily accomplished by merely removing the die plate insert 30 by unscrewing it from the main body of the die plate 10 and inserting a selected replacement die plate insert having the desired orifice characteristics. Also, maintenance is more easily accomplished since the die plate insert may be easily removed for cleaning when necessary. Therefore, the pelletizing machine will be out of service for a relative short time during maintenance, such as when cleaning the extrusion dies and the like, and when replacing the die plate insert with another insert having different orifice arrangements or sizes.

The threaded die plate insert 30 is provided with a suitable stop arrangement which limits the threaded movement to a predetermined relationship so that the wear surface 20 is repositioned in exactly the same position as it was previously in so that the relationship of the wear surface 20 and the knife blades will be retained. This is accomplished by the use of a peripheral flange 31 on one end of the insert 30 for engagement with the exterior of the main body of the die plate 10 with the flange being engaged with the outer surface of the main body of the die plate 10 and received against a shoulder formed by a shallow recess 32 therein as illustrated. This arrangement provides a metal to metal seal between housing 12 and die plate insert 30 along surface contact area 13 to prevent leakage of pressurized molten polymer.

While a screw threaded connection has been illustrated between the die plate insert 30 and the main body of the die plate 10, the removability and interchangeability of die plate inserts may be accomplished by others arrangements which enables quick removal and replacement of the die plate insert. Twist-type inserts or slide-type inserts or any other type of insert connection means may be provided between the die plate insert and the main body of the die plate to enable quick and easy removal and replacement of the die plate insert.

This invention will be used in lieu of presently available extrusion dies which are of one-piece construction. In assemblying the die plate and die plate insert, the main body of the die plate 10 is assembled onto the waterbox of an underwater pelletizer in a conventional manner and the cartridge heaters and heater guard are installed in a conventional manner. The die plate insert is then screw threaded into the die plate with a coating material applied to the threads prior to assembly to prevent seizing of the threads to facilitate removal and replacement of the die plate insert. A suitable spanner wrench can be used for securing the die plate insert in place and removing it. When the die plate insert has been screw threaded into place, the die plate insert and the main body of the die plate will be parallel and the wear surface of the downstream end of the extrusion orifices will be in a predetermined position which will be the same whenever the die plate insert is completely screw threaded into the main body of the die plate. The remainder of the underwater pelletizer is then secured in place by bolting the waterbox and die plate assembly onto an adapter piece to maintain the best possible alignment of the components of the pelletizer. When removing the die plate insert, the waterbox and die plate assembly are removed from the adapter piece and the pelletizer is rolled back so that plastic can be cleaned from the die plate assembly and adapter piece. The spanner wrench is then used to remove the die plate insert from the main body of the die plate with the die plate insert then being cleaned in the usual manner such as applying heat to the extrusion orifices. The cleaned die plate insert or a replacement die plate insert is then assembled into the main body of the die plate and the pelletizer reassembled for start up of the pelletizer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An extrusion die plate for a plastic pelletizing machine comprising a die plate having peripherally located means for receiving heating cartridges for heating the die plate and adapted to be mounted on a housing, said die plate including a large central opening terminating inwardly of the cartridge receiving means and extending from the upstream side to the downstream side, a die plate insert in said opening with the insert including orifice means therein extending from the upstream side of the insert to the downstream side thereof, said insert having a thickness substantially the same as the die plate with the downstream side of the insert having a wear surface projecting beyond the downstream side of the die plate with the orifice means extending through the wear surface, said wear surface adapted to be engaged by the blades on a rotatable knife assembly to form pellets from plastic material extruded through the orifice means, and means removably securing the insert in the opening to enable quick removal for cleaning and quick replacement for insertion of an insert having a different number of or size of orifice means therein, said securing means including means to position the insert axially at a predetermined relation to the die plate in order to reposition the wear surface in exactly the same position when inserts of the same length are changed to maintain a constant relation between the wear surface and the blades on the knife assembly.

2. The extrusion die plate of claim 1 wherein said means removably securing the insert in the opening includes a screw threaded connection between the external periphery of the insert and the internal periphery of the opening, said position means including a peripheral recess in the upstream side of the die plate, and a peripheral flange on the upstream end of the insert, said flange engaging the bottom of the recess in the insert to limit movement of the insert into the opening when the screw threaded connection is tightened for secure mounting and good heat transfer.

3. The invention as defined in claim 2 together with a nose cone mounted on the insert with the periphery of the nose cone being generally co-extensive with the inner edge portion of the extrusion orifice means.

* * * * *